Patented Mar. 21, 1950

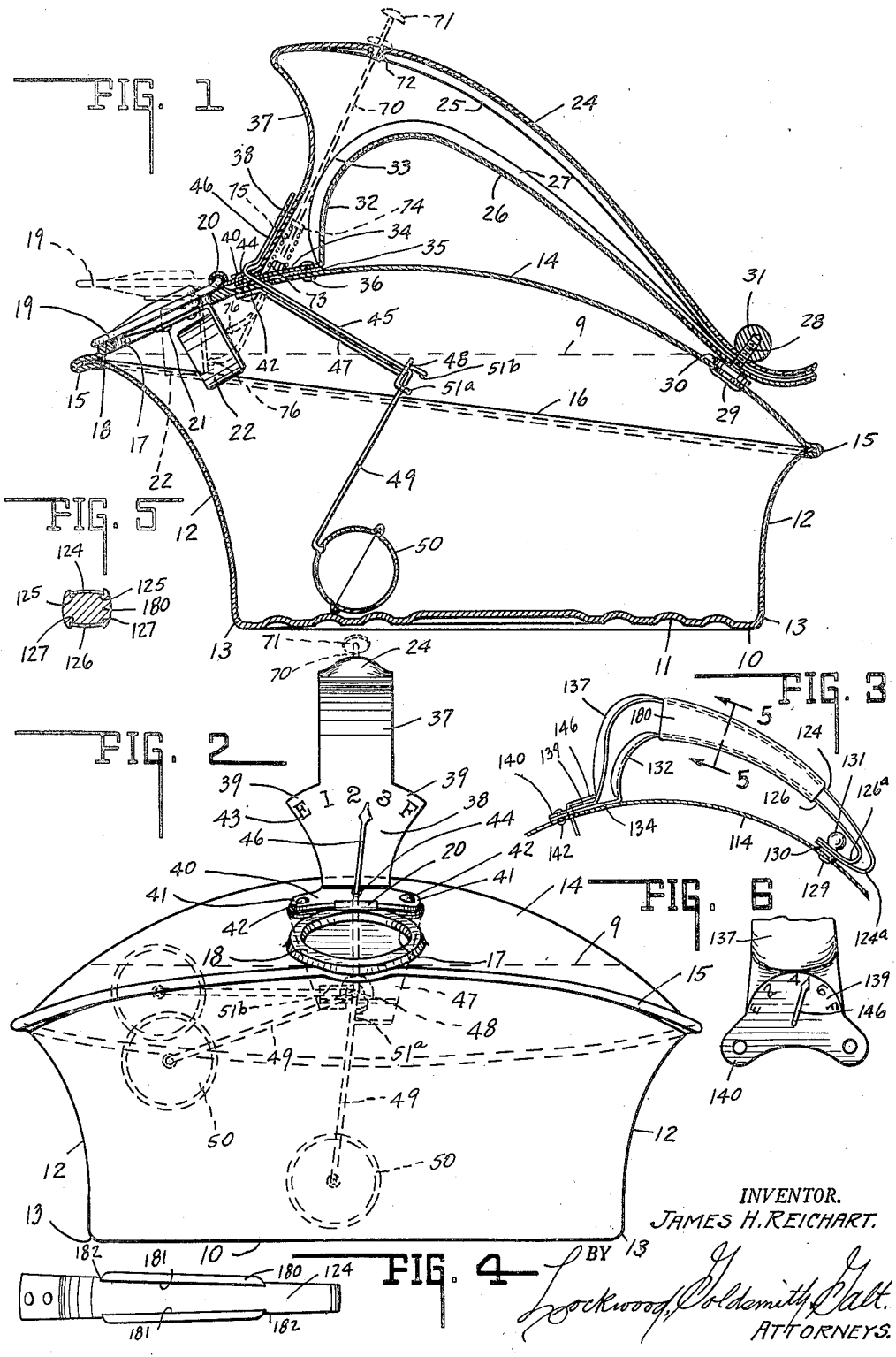

2,501,142

UNITED STATES PATENT OFFICE 2,501,142

TEAKETTLE

James H. Reichart, Muncie, Ind.

Application August 10, 1945, Serial No. 609,990

1 Claim. (Cl. 126—373)

This invention relates to a teakettle.

The chief object of the present invention is to provide a teakettle which has a longer life, is more efficient in the heating of water, and is otherwise more advantageous than the conventional teakettle.

One feature of the invention resides in the outward flaring of the sidewalls which preferably are integral with the bottom.

Another feature of the invention resides in the inclined plane connection between a comparatively shallow domed top and the aforesaid sidewalls.

A further feature of the invention resides in the positioning of the combination spout and filling opening in the cover immediately adjacent the high point of the wall.

A still further feature of the invention resides in the cover mounted handle and its position on the cover.

Still another feature of the invention resides in the vessel content indicating means.

A still further feature of the invention resides in the spout cover which may be of whistling character and which may be remotely controlled for filling and like purposes.

Other objects and features, as well as the foregoing, will be set forth more fully hereinafter.

The full nature of the invention will be understood from the accompanying drawings and the following description and claim:

In the drawings Fig. 1 is a central sectional view of a teakettle embodying the invention, dotted lines illustrating the counterweighted spout cover in an open position and the maximum water level.

Fig. 2 is a front elevation of such a kettle with the spout cover removed and the content indicating means in partially filled position, the central dotted lines indicating the empty kettle position thereof.

Fig. 3 is a side elevation of a modified form of kettle handle, the associated kettle cover being shown in section.

Fig. 4 is a top plan view of such handle.

Fig. 5 is a transverse sectional view taken on line 5—5 of Fig. 3 and in the direction of the arrows.

Fig. 6 is a plan view of a portion of the handle shown in Fig. 3 and the content indicator scale portion thereof and the associated indicating pointer or finger.

In Figs. 1 and 2 of the drawings 10 indicates a substantially circular bottom having therein corrugations 11 for stiffening and other purposes, to-wit, breaking off of lime depositions, increase of convection currents and increased area for heat absorption. Integral with the bottom 10 is the side wall 12 which is progressively flared outwardly and upwardly as illustrated and which is joined to bottom 10 by a rounded corner 13. Preferably bottom 10 is slightly dished upwardly, see Fig. 1. Side wall 12 at the bottom is substantially circular in cross-section and at the top edge 16 is substantially oval or elliptical in cross-section with its minor axis greater than the diameter of the bottom, see Fig. 2, and its major axis greater than both, compare Figs. 1 and 2.

A conventional teakettle has its cover and side wall portions integral and its bottom connected thereto. Denting of this latter connection frequently ruptures such connection with resulting leakage. Denting of the rounded portion 13, which also has a function later to be described, herein accordingly does not result in leakage.

The cover 14 is slightly dome shaped and is seam connected as at 15 to the upper edge of the side wall, said upper edge 16 being inclined downwardly from the maximum water level 9 and as illustrated in Figs. 1 and 2 and for purposes set forth more fully hereinafter.

The cover 14 near its outer and upper edge is apertured at 17 and this may be defined by seat 18, the plane of which is about 22½° more or less to the horizontal and directed oppositely relative to the seam inclination. All exterior surfaces are highly polished while all interior surfaces are of natural finish or etched as desired and for purposes to be set forth. The mouth 17 and seat 18 accordingly serve as a pouring outlet (functioning as a spout) and as a filling opening.

The mouth cover 19 is hinged at its high point by portion 20 hereinafter referred to and may be imperforate as shown or of the whistling type, several of which are illustrated, described and claimed in the copending application, Serial No. 561,080 filed October 30, 1944, and entitled "Hinged whistle construction," and made a part hereof. Said cover 19 has suitably secured to it, if necessary, at 21 a counterweight 22 that normally constrains the cover to its seat until steam pressure overcomes such constraint which vents the kettle and relieves the excess pressure. Of course, if the mouth cover is of whistling character as described, see the aforesaid application, the action resulting from steam pressure will be as described therein.

Since the mouth plane is about 22½° to the horizontal, as soon as the kettle is tilted about 45°, the weight 22 becomes effective to hold open the cover. Whereas in other kettles of the combination filling and pouring single opening type kettle, see the aforesaid application, emptying requires tilting of more than 90°, herein, however, tilting of but 67½° by reason of the mouth location and flaring of the side walls and inclination of edge 16 will result in complete emptying of the kettle.

In such emptying the counterweight 22 herein assists in holding open the said mouth cover 19. For filling purposes the said cover may be finger lifted to slightly beyond the vertical position and the vessel filled from the faucet, the latter serving, if desired, to hold the cover 19 open for such purposes. Positive and remotely actuated means may be provided, if desired for cover 19 elevation and as herein disclosed.

The handle for the kettle is of unique character and has several functions. Herein same is shown formed of two pieces. However, same may be formed of one piece or several pieces.

In Figs. 1 and 2 the upper piece includes an elongated portion 24 that extends upwardly and forwardly and has depending sides 25 joined thereto to form a smooth bearing surface. Therebeneath is an arched lower piece having elongated portion 26 with upwardly directed sides 27 joined thereto to form a smooth bearing surface. These side portions are directed towards each other and the elongated portions diverge upwardly and forwardly and converge downwardly and rearwardly, the sides tapering out until said pieces abut if desired.

A threaded stem 28 projects upwardly and rearwardly from cover 14 near the rear thereof, being secured thereto as at 29. Pieces 24 and 26 are apertured to pass the stem 28. An insulating and cushion member 30 is stem mounted and insulates the resulting handle from the cover since the insulation is of cork or the like. An ornamental nut 31 on stem 28 secures the rear end of the resulting handle to the cover.

The forward portions of member 26 and sides 27 are curved downwardly as at 32 and 33 respectively until cover 14 is engaged. A forward extension 34 operatively bears on cover 14 through a similar (cork) insulating and cushion member 35 and is secured to the cover as by rivets 36.

The forward portion of member 24 is directed downwardly and rearwardly as at 37 and same lies forwardly of portion 33. The lower portion 38 is substantially flat and enlarged laterally and oppositely at 39. The lower end extends forwardly at 40 being enlarged laterally as at 41, see Fig. 2. Rivets 42 secure the cushion and end 40—41 to cover 14. A central tongue portion thereof is curled to form hinge portion 20 previously described.

The portion 38 is provided with an arcuate scale 43 and coaxial therewith is aperture 44 that pivotally supports shaft 45 carrying external indicator, finger or arrow 46. Interiorly of cover 14 and by the aforesaid rivets 42 there is secured a bracket 47 that underlies elongated shaft 45. The innermost and lower end of the bracket is divided longitudinally and one division comprises an upwardly extending apertured ear 48 that pivotally supports shaft 45.

Beyond such support the shaft wire is extended transversely to form arm 49 to the lower end of which is suitably secured a float 50. The other divisions of the lower end of this bracket 47 provide stops 51a and 51b to limit swinging movement of float 50, see dotted lines in central portion of Fig. 2. When the kettle is substantially empty, the arrow indicates empty and arm 49 contacts stop 51a, and when the kettle is full, the arrow indicates same and arm 49 contacts stop 51b.

In certain instances it is highly desirable to provide means for positively tilting the mouth cover 19 in opposition to its constraint 22. Herein such a means is disclosed as an upwardly constrained rod 70 having a finger engageable button 71 exposed on and by the upper forward portion of the handle, the rod extending downwardly in the front of the handle between the two handle members if the handle is of open strap type as illustrated.

Herein portion 24 has a drawn guide 72 directed downwardly and extension 34 has a drawn guide 73 directed upwardly, the same forming aligned guides and coaxial apertures for guidance and support of rod 70. The constraint for rod 70 may comprise a stop 74 on same and a concentric spring 75.

Of course, insulation 35 and cover 14 are apertured to pass the rod 70 which terminates in angular portion 76 that is juxtapositioned to weight 22. It may even contact same in normal position or just clear it. However, upon finger or thumb depression of head or button 71, arm 76 rides the weight 22 and tilts open the mouth cover 19 in opposition to the weight 22.

This structure is particularly advantageous for one hand filling of the kettle as follows: The kettle is grasped by the handle and tilted to about thirty or so degrees clockwise in Fig. 1, that is, plane of seat 18 is slightly tilted in the opposite direction. Quick application of thumb pressure on the button 71 will tilt the cover 19 overcenter as it were on its pivot 20 and it will be held open by gravity while the kettle is filling. The mouth 17 naturally is large enough, as illustrated, to pass the weight, and when so positioned, the weight does not obstruct mouth 17. When the kettle is filled to the desired degree and horizontally positioned, the weight 22 bears such relation to the cover and normal plane of the mouth 17 or seat 18 that the cover is automatically closed by gravity.

The rounded corner 13 integral with bottom 10 and side walls 12 reenforces both as previously stated. It also serves to deflect upwardly along the walls the rising heated water. The corrugations 11 in the bottom, in addition to structurally reenforcing same and accommodating expansion and contraction, and the interior surface etching if utilized, presents a larger actual area or surface contacted by the water for heating same.

The outward flaring of the side walls expedites the heating of cold water, because as this heats, the warm water rises so that circulation of upper cold water toward the bottom is expedited. Furthermore, heated air rising externally about the vessel heats the overhanging side wall, as it were, and thus facilitates and expedites water heating if the kettle is about half full or more.

Furthermore, due to the positioning of the mouth 17 immediately adjacent the top of the cover 15, the kettle, when full, see dotted line 9, will have water in cover contact near the rear end of the handle so that the handle grasping portion, where closest to the cover, will not be subject to steam but only the hot water so that it will be cooler comparatively than otherwise if the vessel be filled.

The cover 14, by reason of the low dome shape, and the side 12 by reason of the flaring, have a junction seam 15—16 at a relatively acute angle which provides additional reenforcement and strength to the vessel and is more resistant to denting than the common edge of two parallel plates because of the mutual bracing effect. The low dome effect also results in better heat reflection from the steam heated cover interior back to the water in the kettle, and, of course, if the water level is such that water contacts the steam heated cover at the rear thereof, the cover heat will be abstracted therefrom by the water contacting the cover at the lower part thereof. This insures relatively a cooler cover, and hence, a cooler zone in which the handle is positioned so that the metal strap type handle illustrated is not objectionable from a temperature standpoint.

The positioning of the mouth 17 at the forward portion of the cover and in close proximity to the seamed edge 15 between the cover and side wall facilitates dripless pouring. It, furthermore, has this advantage; pouring from a full kettle or nearly empty kettle can be effected without hand cramping, which cramping usually is prevalent with the conventional 45° mouth combination unitary intake and spout kettle when similarly filled and pouring is effected therefrom.

The thin strap type handle also provides in effect a ventilated handle in that more surface inside and outside on the side walls and portions 24 and 26 have a greater total radiation capacity than a solid handle of comparable volume and general shape.

Whenever desired or required, the confronting side wall and cover surfaces to be seamed together may be coated with a heat curing cement, so that when seamed together and heated, the seam is steam and water tight, and therefore leakproof.

The seat 18 while herein apparently shown solid and appreciably thicker than cover 14, is, however, actually formed from the cover by first embossing the metal outwardly, then turning it inwardly and then turning it radially outward back on itself providing two thicknesses of metal besides the strength of the embossment.

In Figs. 3 to 5 there is illustrated a modified form of handle construction. 114 indicates the supporting cover, 129 the head of the bolt upon which is threaded nut 131 whereby the handle strap ends 124a and 126a are secured together and to the cover with insulation washer 130 interposed therebetween.

The handle straps 124 and 126 are reversely curved in transverse section, see Fig. 5, and same have inwardly directed edges as at 125 and 127 respectively which provide additional locks. The forward portion of the handle straps are directed downwardly toward cover 114 as at 137 and 132 respectively and the cover adjacent ends 140 and 134 respectively are riveted thereto as at 142.

Between the portions 124 and 126 there is included a handle 180 of plastic, wood or suitable non-heat conducting material. This plastic handle is held in place by notchings 181 in the straps. Each strap includes side edge spaced pairs of notches 181 and the ends 182 of each notch thereof, see Fig. 4, are directed oppositely and inwardly. This notching conforms to the radii or bevels at each end of the plastic handle and at the top and bottom thereof.

These notchings keep the handle from slipping backward or forward on the metal strap parts, and also anchor the upper and lower metal handle parts together giving them greater rigidity. When the plastic handle 180 is placed between these two metal parts and they are pulled together, the metal strap parts, being so designed, bring a pressure to bear on the plastic handle part. When they are riveted together near the forward end and secured together at the final, terminal or back end, the plastic handle is held rigidly in place. The nut and bolt may be replaced by a rivet so that there is no enlarged projection on the handle.

Since the plastic handle extends above and below the metal strap parts, the hand does not come in contact with these metal parts when lifting, for they are projected upwardly and downwardly a sufficient distance to prevent the hand from touching said metal parts.

In gripping the handle it is natural that the fingers form a downward arch and the upper inside part of the hand forms a top arch, thereby further spacing the flesh of the hand and finger away from contact with the metal straps at either the top or bottom of the handle.

In Fig. 6 the last mentioned form of handle has its scale indicating portion 139 positioned flatwise instead of directed upwardly as in Figs. 1 and 2 and associated therewith is a flat type indicating finger 146.

While the invention has been illustrated and described in great detail in the drawings and foregoing description, the same is to be considered as illustrative and not restrictive in character.

The several modifications described herein, as well as others which will readily suggest themselves to persons skilled in this art, all are considered to be within the broad scope of the invention, reference being had to the appended claim.

The invention claimed is:

A kettle having a bottom, side walls flaring outwardly and upwardly therefrom, a shallow domed cover rigidly connected to the side wall upper and outer edge, the cover including a combination pouring and filling mouth immediately contiguous the dome and side wall edge connection, mouth cover means hingedly supported adjacent the mouth and above the highest elevation thereof, the cover-wall connection having a bulge-like depression adjacent the mouth, wall connection and means normally constraining the mouth cover to mouth closing position, and manually operable means having an exposed operating portion and a kettle enclosed portion for positively opening said mouth cover and in opposition to said constraining means.

JAMES H. REICHART.

REFERENCES CITED

The following references are of record in the file of this patent:

UNITED STATES PATENTS

| Number | Name | Date |
|---|---|---|
| 562,761 | Cram | June 23, 1896 |
| 1,472,313 | Turner | Oct. 30, 1923 |
| 1,492,777 | Clarke | May 6, 1924 |
| 1,531,274 | Cowden | Mar. 31, 1925 |
| 1,743,283 | Porges | Jan. 14, 1930 |

FOREIGN PATENTS

| Number | Country | Date |
|---|---|---|
| 324 | Great Britain | 1894 |
| 3,083 | Great Britain | 1889 |
| 12,075 | Great Britain | 1904 |
| 19,030 | Great Britain | 1889 |
| 114,610 | Great Britain | 1918 |
| 136,285 | Great Britain | Dec. 18, 1919 |
| 156,468 | Great Britain | Jan. 13, 1921 |
| 419,163 | Great Britain | Nov. 7, 1934 |
| 486,800 | Great Britain | June 10, 1938 |